US010086867B2

(12) United States Patent
Haroldsen et al.

(10) Patent No.: US 10,086,867 B2
(45) Date of Patent: Oct. 2, 2018

(54) STEERABLE SYSTEM FOR ASPHALT MILLING ATTACHMENT

(71) Applicants: J. Tron Haroldsen, Herriman, UT (US); Matthew H. Taylor, Lehi, UT (US)

(72) Inventors: J. Tron Haroldsen, Herriman, UT (US); Matthew H. Taylor, Lehi, UT (US)

(73) Assignee: Asphalt Zipper, Inc., Pleasant Grove, UT (US)

( * ) Notice: Subject to any disclaimer, the term of this patent is extended or adjusted under 35 U.S.C. 154(b) by 0 days.

(21) Appl. No.: 13/686,461

(22) Filed: Nov. 27, 2012

(65) Prior Publication Data
US 2013/0134765 A1 May 30, 2013

Related U.S. Application Data

(60) Provisional application No. 61/565,278, filed on Nov. 30, 2011.

(51) Int. Cl.
| | | |
|---|---|---|
| *E01C 23/08* | (2006.01) | |
| *B62D 5/20* | (2006.01) | |
| *E01C 23/12* | (2006.01) | |
| *E01C 23/088* | (2006.01) | |

(52) U.S. Cl.
CPC .............. *B62D 5/20* (2013.01); *E01C 23/088* (2013.01); *E01C 23/127* (2013.01)

(58) Field of Classification Search
CPC .............................. E01C 23/088; E01C 23/127
See application file for complete search history.

(56) References Cited

U.S. PATENT DOCUMENTS

| | | | |
|---|---|---|---|
| 3,971,594 A * | 7/1976 | Wirtgen | 299/39.6 |
| 4,270,801 A | 6/1981 | Swisher, Jr. et al. | |
| 4,896,995 A * | 1/1990 | Simmons | 404/90 |
| 4,922,574 A | 5/1990 | Heiligenthal et al. | |
| 5,190,398 A * | 3/1993 | Swisher, Jr. | 404/90 |
| 5,373,902 A | 12/1994 | Lindblom | |
| 5,676,490 A * | 10/1997 | Nelson | 404/94 |
| 6,116,699 A | 9/2000 | Kaczmarski et al. | |
| 6,247,757 B1* | 6/2001 | Cochran | 299/39.6 |
| 6,328,387 B1* | 12/2001 | Cooper et al. | 299/39.6 |
| 6,494,542 B1* | 12/2002 | Watt | 299/39.4 |
| 6,497,294 B2* | 12/2002 | Vought | 172/122 |
| 6,953,303 B1* | 10/2005 | Chase et al. | 404/94 |
| 7,036,252 B2 | 5/2006 | Haroldsen et al. | |
| 7,144,087 B2 | 12/2006 | Haroldsen et al. | |
| 7,523,995 B2* | 4/2009 | Rio | E01C 23/088 180/209 |
| 7,942,604 B2 | 5/2011 | Willis et al. | |
| 8,220,806 B2* | 7/2012 | Neudeck | 280/62 |

(Continued)

*Primary Examiner* — John J Kreck
(74) *Attorney, Agent, or Firm* — Michael F. Krieger; Kirton McConkie

(57) ABSTRACT

A steering mechanism for a milling attachment device provides steering capability without impeding cutting depth control. The steering mechanism has at least one wheel that is rotated by an actuating mechanism such as an extending cylinder, synchronized actuators, or the like. The steering mechanism may be integrated with depth control by using a parallelogrammic structure with pivot points to assist in the depth control or may operate independent of and without impeding depth control.

5 Claims, 7 Drawing Sheets

(56) References Cited

U.S. PATENT DOCUMENTS

2003/0127905 A1\* 7/2003 Haroldsen et al. .......... 299/39.6
2006/0070754 A1 4/2006 Zanetis et al.
2007/0116519 A1 5/2007 Haroldsen
2010/0308640 A1 12/2010 Haroldsen et al.

\* cited by examiner

STEERABLE SYSTEM FOR ASPHALT MILLING ATTACHMENT

RELATED APPLICATION

This patent application claims the benefit of U.S. Provisional Patent Application Ser. No. 61/565,278 that was filed on Nov. 30, 2011, for an invention titled STEERABLE SYSTEM FOR ASPHALT MILLING DEVICE, which is hereby incorporated herein by this reference.

BACKGROUND OF THE INVENTION

1. Field of the Invention

The present invention relates to systems and methods for milling asphalt. More specifically, the present invention relates to attachable systems and methods that improve milling by providing steering capability while maintaining depth control for a milling device.

2. The Relevant Technology

Portable asphalt milling attachments historically comprise two principal features. They have a way to control the depth that the milling attachment device cuts. They also have a way to facilitate the changing of bits mounted to a cutting wheel of the milling attachment device. However, such devices are quite heavy and can prove very difficult to steer and keep on line, particularly when the host vehicle is small or has difficulty moving very heavy objects.

The pending application Ser. No. 12/792,933, entitled "Asphalt Milling Attachment with Depth Control and Bit Access," which has been published as United States Publication No. 2010/0308640 A1 and which is specifically incorporated by this reference, discloses that the front of the machine could use a skid foot to contact the ground to maintain depth or it could use a wheel. Also disclosed is that the skid foot could be solid or it could pivot to follow the ground, or that it could use a combination of both. However, steering capability for the skid plate or wheel is not provided.

Accordingly, a need exists for a new system and method for providing steering capability for an asphalt milling attachment while maintaining depth control and bit access. Such systems and methods are disclosed herein.

BRIEF SUMMARY OF THE INVENTION

The present invention has been developed in response to the present state of the art, and in particular, in response to the problems and needs in the art that have not yet been fully solved by currently available asphalt milling/trenching attachments.

This disclosure provides steering capability that operates independent of or can be integrated with depth control and will not interfere with bit access.

The front of the machine has one or more steerable wheels that are controlled hydraulically, electrically, pneumatically, or by using any other suitable drive. The wheel or wheels may be of any suitable type, including caster-type wheels, and may be raised or lowered to maintain desired depth control in the milling/trenching process. In certain embodiments, the steerable wheels are disposed forward of the milling assembly such that they will not impede bit access for repair and/or replacement.

Asphalt milling devices are quite heavy and some are self-propelled. The self-propelled asphalt milling devices are steerable, but are extremely expensive and have limitations. Asphalt milling attachments can be attached to and maneuvered by a host vehicle, but heretofore the host vehicle provides the steering. Because asphalt milling attachments are quite heavy, smaller host vehicles or host vehicles that have difficulty moving very heavy objects have difficulty steering when a milling attachment is attached. The attachment embodiments disclosed herein facilitate maneuverability by providing a steering mechanism for the attachment. The asphalt milling attachments of the present disclosure could use a bucket slot in the rear of the asphalt milling attachment to allow a host vehicle to connect to it. Alternatively, other known quick-connects (JRB style, skid steer or balderson style) could be used. Host vehicles for the asphalt milling attachment could include back hoes, loaders, excavators, track hoes, skid steers and the like. However, without the steering capability provided in the present disclosure, steering the asphalt milling attachment or maintaining a desired line and milling depth can prove to be very difficult for an operator of the device, particularly if the host vehicle is a smaller vehicle. The present invention is much more versatile than known asphalt milling devices because it provides steering capability for the asphalt milling attachment that can be attached to and used by a broader range of host vehicles. In one embodiment, the wheel is a caster wheel that can be locked into a particular orientation (such as directly forward) or unlocked so that the operator can steer the device right or left. In some embodiments, the steering capability is independent of the depth control, and does not interfere with depth control. In other embodiments the steering is integrated with the depth control such as when the wheel is also connected to a framework that can be raised or lowered to assist in controlling the depth of the milling performed by the device.

With the steerable wheel system in use, the intended use of the asphalt milling device could be to cut asphalt, concrete or any other road construction/parking lot material. The milling device could also be used for soil stabilization. It could be used for full depth reclamation of roads. These and other features will become more fully apparent from the following description, or may be learned by the practice of the steerable wheel system as set forth hereinafter.

BRIEF DESCRIPTION OF THE SEVERAL VIEWS OF THE DRAWINGS

In order that the manner in which the above-recited and other features and advantages of the invention are obtained will be readily understood, a more particular description of exemplary embodiments of the invention, briefly described above, will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Exemplary embodiments of the invention will be best understood by reference to the drawings, wherein like parts are designated by like numerals throughout. It will be readily understood that the components of steerable asphalt milling devices, as generally described and illustrated in the figures herein, could be arranged and designed in a wide variety of different configurations. Thus, the following more detailed description of the embodiments of the present disclosure, as represented in the figures, is not intended to limit the scope of the invention, as claimed, but is merely representative of exemplary embodiments of the invention.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

In this application, the phrases "connected to", "coupled to", and "in communication with" refer to any form of interaction between two or more entities, including mechanical, hydraulic, electrical, magnetic, electromagnetic, and pneumatic interactions.

The phrases "attached to", "secured to", and "mounted to" refer to a form of mechanical coupling that restricts relative translation or rotation between the attached, secured, or mounted object, respectively.

The term "pivoting" refers to items that rotate about an axis. A "pivoting engagement" is an engagement between two or more items in direct contact, with one or more of the items being capable of pivoting about an axis common to each of the items.

Figure 1:
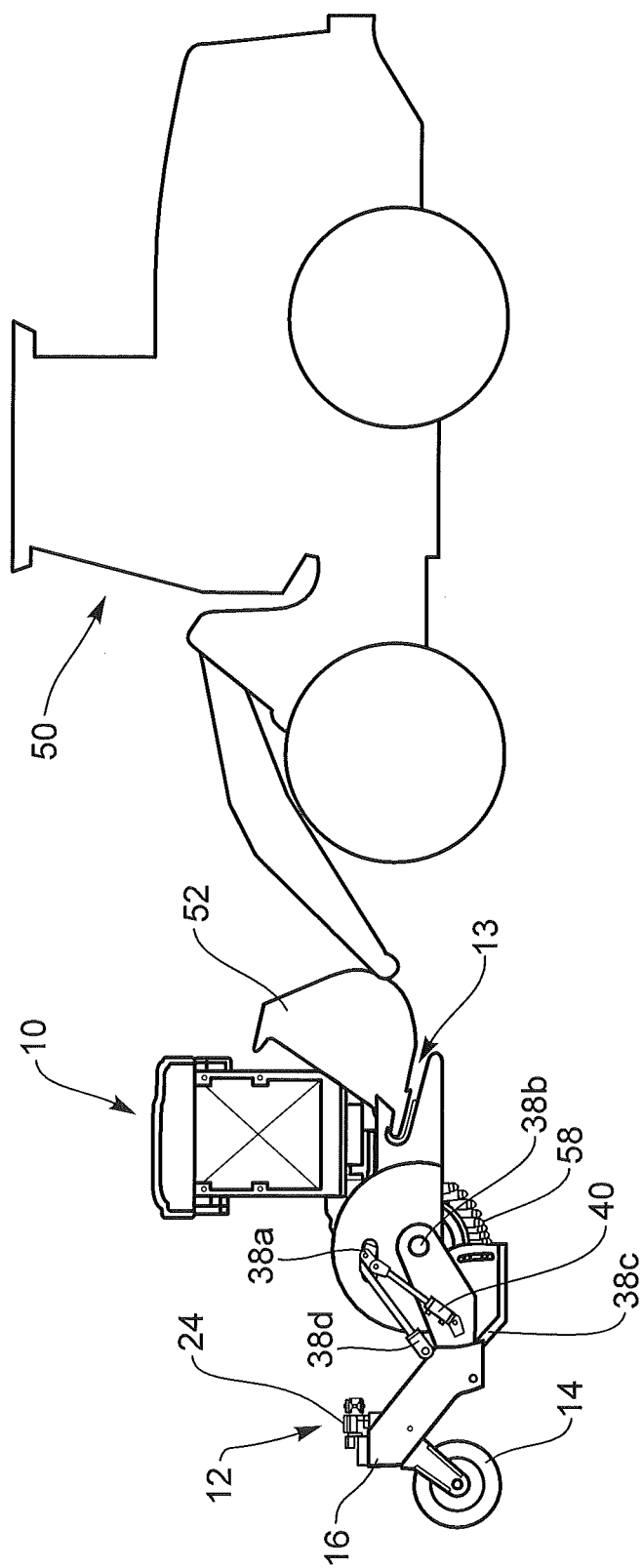
FIG. 1 is an elevation view of an asphalt milling device with a steering mechanism and showing a host vehicle in outline to illustrate one exemplary method for connecting the host vehicle to the asphalt milling device.

FIG. 1 is an elevation side view of an embodiment of an asphalt milling device 10 with a steering mechanism 12 and is shown as attached to an exemplary host vehicle 50. This embodiment shows that the asphalt milling device 10 is an attachment that is connected to a bucket-type of host vehicle 50 that can be used to drive and steer the device 10. The host vehicle 50 has a bucket 52 that engages a bucket slot 13 on the asphalt milling device 10. Alternatively, known quick-connects (JRB style, skid steer or balderson style) can be used to connect the host vehicle 50 to the asphalt milling device 10. Because the asphalt milling device 10 has a steering mechanism, various types of host vehicles 50 can be used to connect to and steer the steerable asphalt milling device 10, including back hoes, loaders, excavators, track hoes, skid steers and the like.

Figure 2:
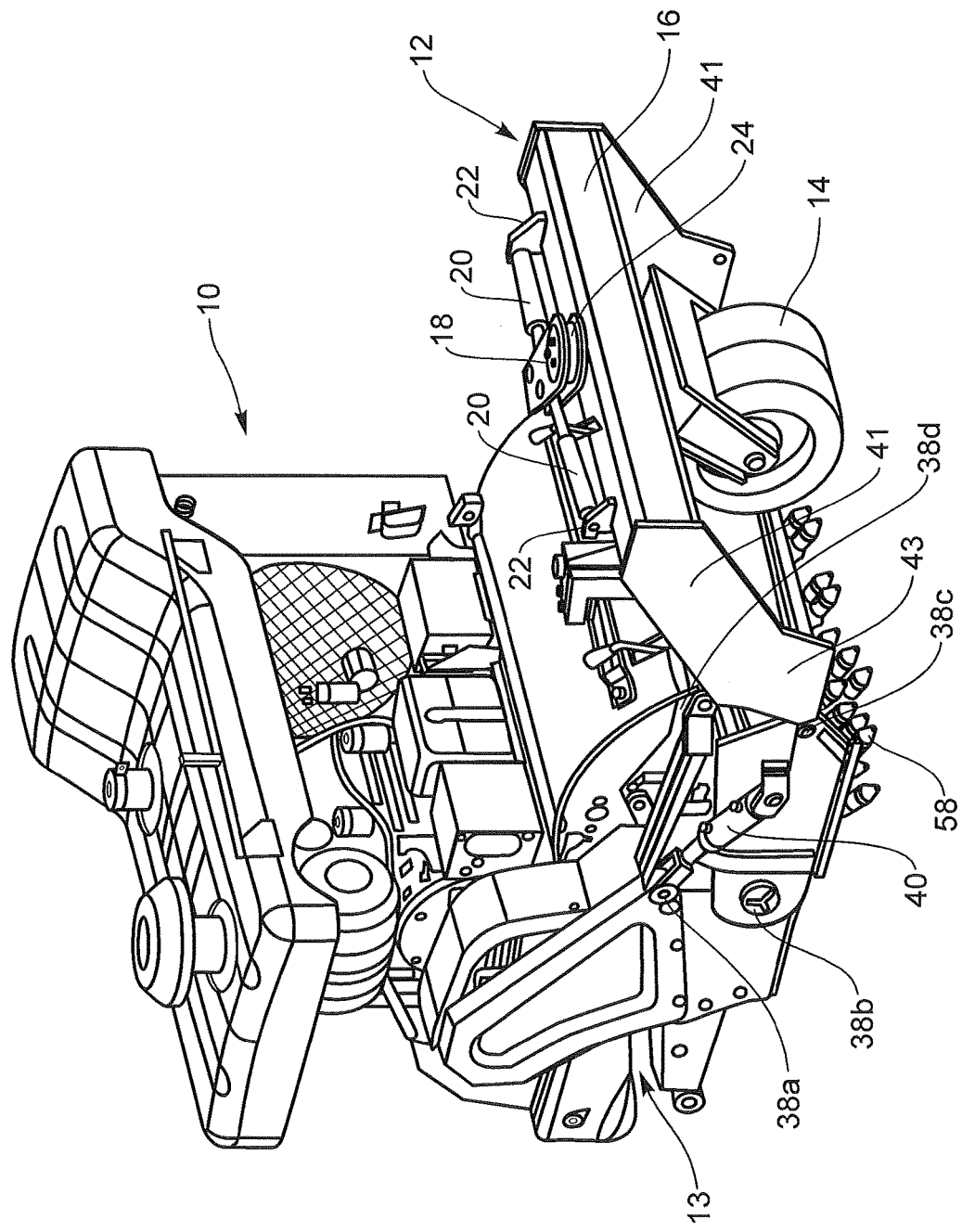
FIG. 2 is a perspective view of an exemplary asphalt milling device with a steering mechanism.

FIG. 2 is a perspective view of an exemplary asphalt milling device 10 with the steering mechanism 12 ready for connection to the host vehicle 50. The steering mechanism 12 comprises a wheel 14 pivotally mounted to a support bar 16 via a substantially vertically disposed pivot shaft 18, a pair of cooperating, steering actuators 20, a pair of stationary brackets 22, a rotating bracket 24, and a hydraulic drive (not shown). In FIG. 2, the wheel 14 is a caster-type wheel securely connected to the pivot shaft 18 so that when the pivot shaft 18 rotates, the wheel 14 also rotates. It should be understood that other types of wheels can be used, but the caster-type wheel 14, as shown in FIGS. 2 and 3, is particularly suitable for the intended use.

The pivot shaft 18 is carried in a shaft opening in the support bar 16 and extends above the support bar 16 so that the rotating bracket 24 can be attached to the pivot shaft 18. The rotating bracket 24 comprises a collar 28 and laterally extending ears 30 (the reference numerals 28, 30 are not shown in FIG. 2 so not to obscure other features of the device; however, collar 28 and ears 30 may be similar to what is shown in FIG. 3). The collar 28 fits snug about the pivot shaft 18 and can be secured to the pivot shaft 18 by any suitable means, such as by screw, bolt, key, set screw, weld, or the like. Ears 30 provide a location for pivotally attaching the cooperating steering actuators 20. Each of the stationary brackets 22 is secured to the support bar 16 and spaced to provide locations for pivotally attaching the cooperating steering actuators 20. One end of each steering actuator 20 is pivotally attached to a stationary bracket 22 while the other end is pivotally attached to ears 30 of the rotating bracket 24, so that distance between the two stationary brackets 22 is covered by the ears 30 and steering actuators 20, with the ears 30 being disposed between the two steering actuators. In this manner, as one of the steering pistons 20 contracts, the other steering piston 20 extends, thereby causing the ears 30 to move to the right or left and rotating the pivot shaft 18 and wheel 14 accordingly. A hydraulic drive (not shown in FIG. 2) is connected to the steering pistons 20 via hydraulic hoses and fittings 32 (not shown in FIG. 2). By regulating the extension and contraction of the steering actuators 20 via the delivery of hydraulic fluid through the hoses and fittings 32, the user can steer the wheel 14 in a desired direction. Although a hydraulic drive is disclosed, it should be understood that other types of drives may suitably rotate the pivot shaft 18, thereby steering the wheel 14.

Figure 3:
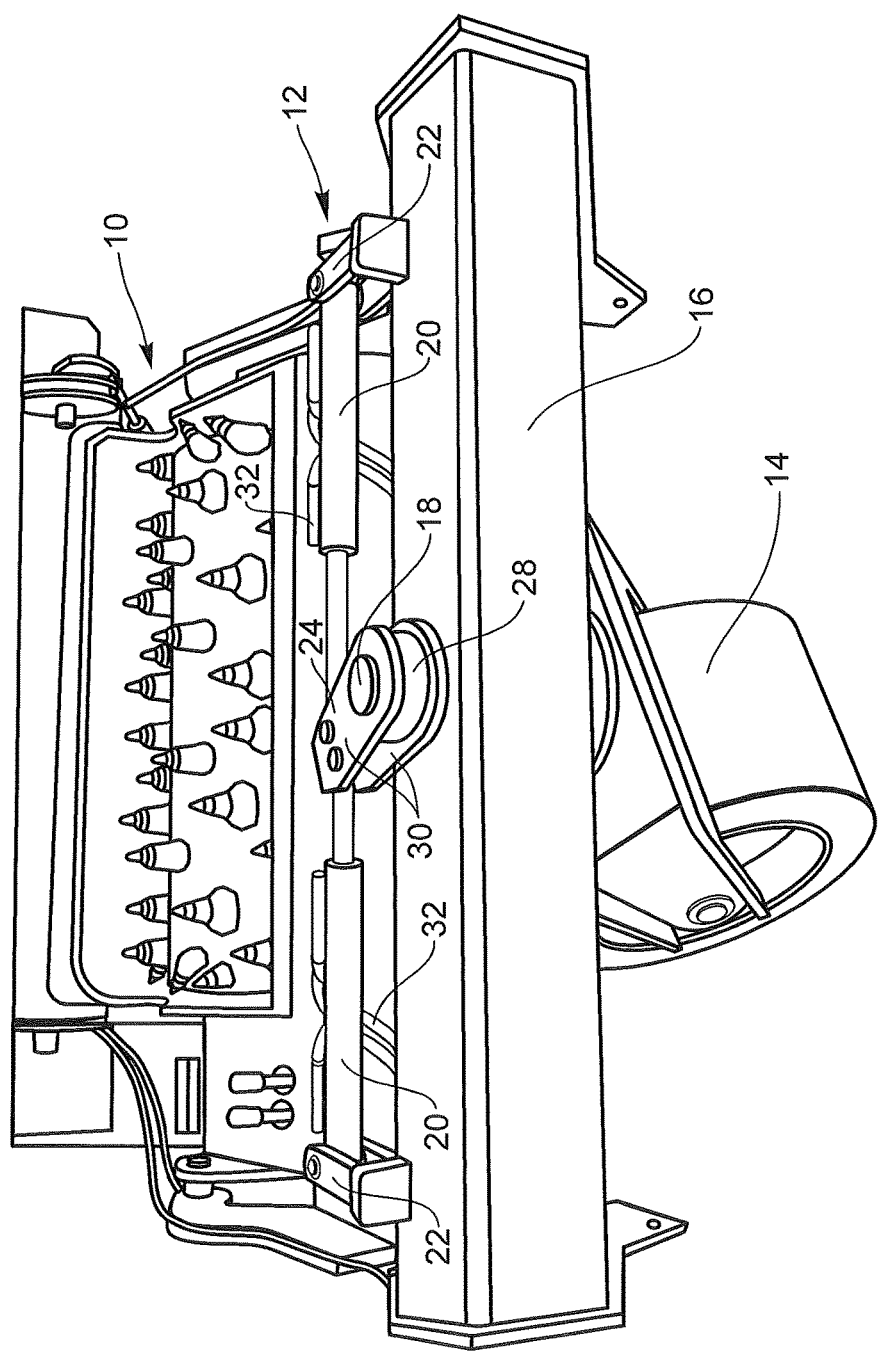
FIG. 3 is a perspective frontal view of an asphalt milling device showing various components of an exemplary steering mechanism.

FIG. 3 is a perspective frontal view of an exemplary embodiment of an exemplary asphalt milling device 10. The steering mechanism 12 comprises a wheel 14 pivotally mounted to a support bar 16 via a substantially vertically disposed pivot shaft 18, a pair of cooperating, steering actuators 20, a pair of stationary brackets 22, a rotating bracket 24, and a hydraulic drive (not shown). In FIG. 3, the wheel 14 is a caster-type wheel securely connected to the pivot shaft 18 so that when the pivot shaft 18 rotates, the wheel 14 also rotates. It should be understood that other types of wheels can be used, but the caster-type wheel 14 is particularly suitable for the intended use.

The pivot shaft 18 is carried in a shaft opening in the support bar 16 and extends above the support bar 16 so that the rotating bracket 24 can be attached to the pivot shaft 18. The rotating bracket 24 comprises a collar 28 and laterally extending ears 30. The collar 28 fits snug about the pivot shaft 18 and can be secured to the pivot shaft 18 by any suitable means, such as by screw, bolt, key, set screw, weld, or the like. Ears 30 provide a location for pivotally attaching the cooperating steering actuators 20. Each of the stationary brackets 22 is secured to the support bar 16 and spaced to provide locations for pivotally attaching the cooperating steering actuators 20. One end of each steering actuator 20 is pivotally attached to a stationary bracket 22 while the other end is pivotally attached to ears 30 of the rotating bracket 24, so that distance between the two stationary brackets 22 is covered by the ears 30 and steering actuators 20, with the ears 30 being disposed between the two steering actuators. In this manner, as one of the steering actuators 20 contracts, the other steering actuator 20 extends, thereby causing the ears 30 to move to the right or left and rotating the pivot shaft 18 and wheel 14 accordingly. As shown in FIG. 3, the steering actuators 20 are hydraulic pistons. However, it is contemplated that the steering actuators 20 may be electrical, pneumatic, or may be powered by any other suitable drive without departing from the concepts of the invention contemplated. For clarity in the remaining description, the steering actuators 20 are hydraulic pistons, as shown.

The hydraulic drive (not shown in FIG. 3) is connected to the steering actuators 20 via hydraulic hoses and fittings 32. By regulating the extension and contraction of the steering actuators 20 via the delivery of hydraulic fluid through the hoses and fittings 32, the user can steer the wheel 14 in a desired direction.

Figure 4:
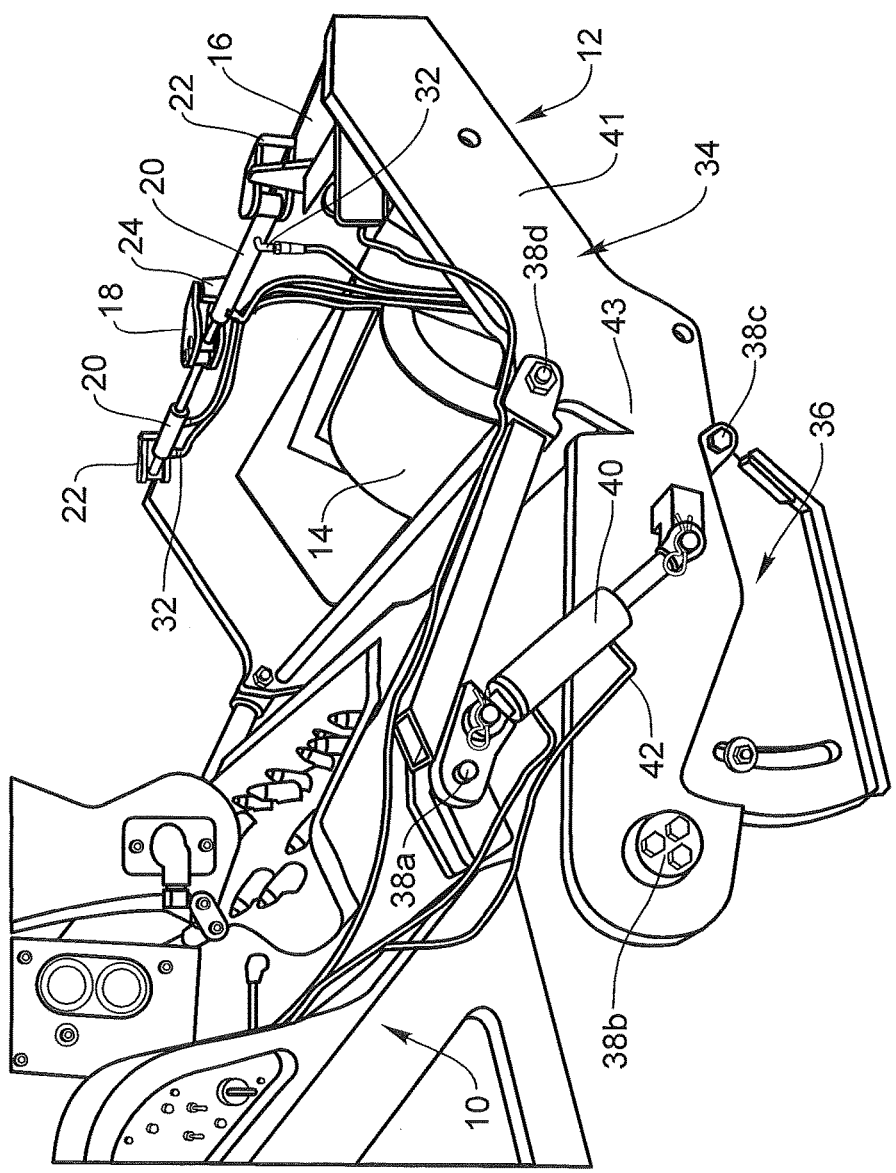
FIG. 4 is a perspective right side view of the steering mechanism for the asphalt milling device.
Figure 5:
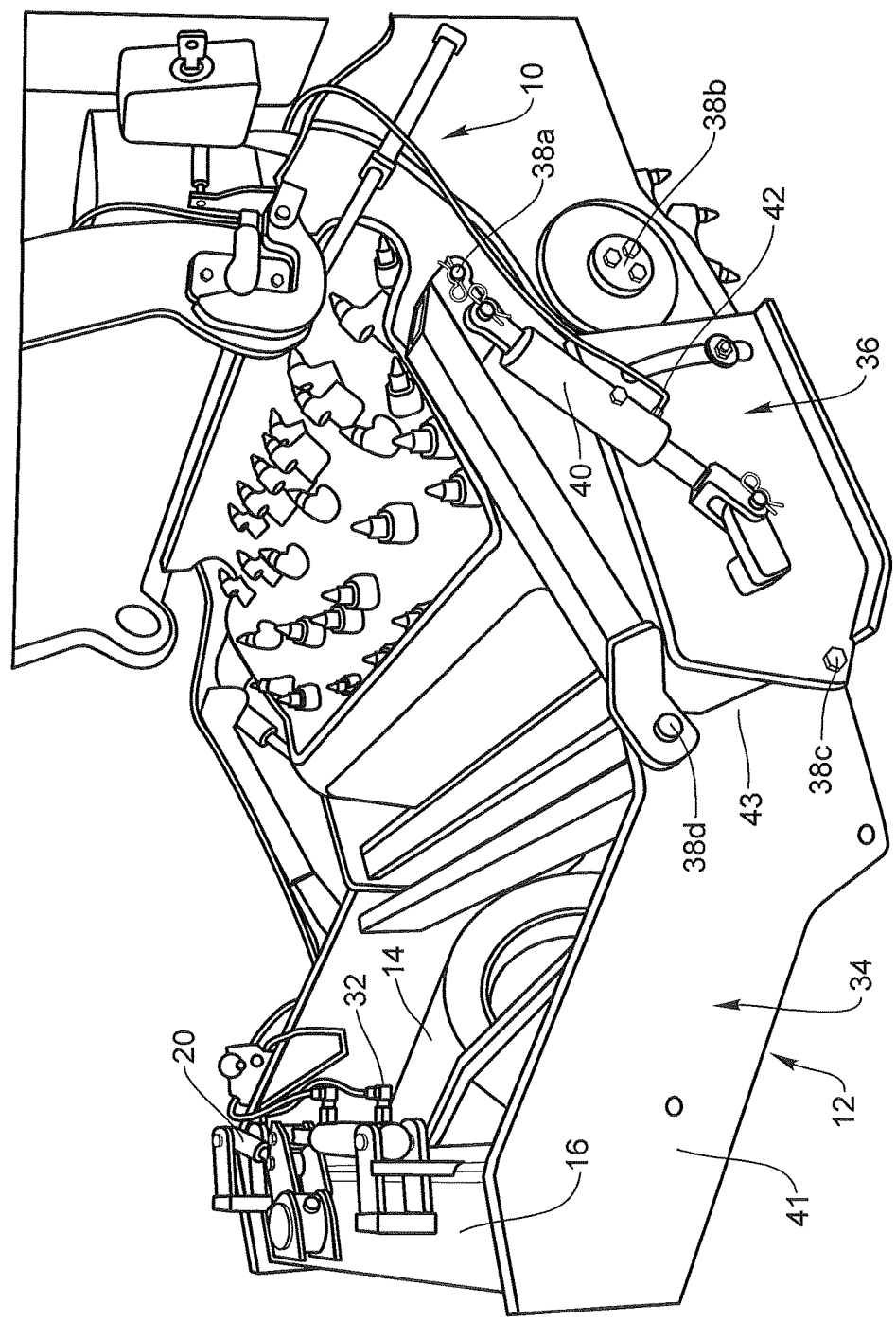
FIG. 5 is a perspective left side view of the steering mechanism for the asphalt milling device.

FIGS. 4 and 5 are perspective right side and left side views, respectively, of the steering mechanism 12, showing a height-adjustment mechanism 34 for the steering mechanism 12 Because the asphalt milling device 10 can mill to various depths, the height of the wheel 14 of the steering mechanism 12 is also adjustable to assist in maintaining depth control. In some embodiments, the wheel 14 can be raised and lowered using a pivoting parallelogrammatic structure, generally designed as 36, and comprising four pivot points 38a, 38b, 38c, and 38d. Between pivot points 38a and 38c, a height-adjusting strut such as a height-adjusting hydraulic piston 40 is provided. By extending and contracting the length of the height-adjusting strut (e.g., a hydraulic piston 40), the configuration of the parallelogrammatic structure 36 will change and the support bar 16 and wheel 14 can be raised and lowered to achieve a desired milling depth or to lift the front of the asphalt milling device 10 to clear a zero milling depth. Although a hydraulic piston 40 is shown, it should be understood that any type of height-adjusting strut that effectively alters its operating length with respect to the parallelogrammatic structure 36 may be used. Also, it should be understood by those skilled in the art that the height-adjusting strut can be connected to the parallelogrammatic structure 36 between points on the structure other than pivot points 38a and 38c, so long as the strut can still change the configuration of the structure 36 to raise and lower the support bar 16. By way of example of struts other than a hydraulic piston 40, the strut can be length-adjustable or telescoping linkage that is attached between adjacent sides of the parallelogrammatic structure 36.

As shown in both FIGS. 4 and 5, a support arm 41 is connected to the support bar 16 and a portion of the support arm 41 (designated as 43) forms one of the sides of the parallelogrammatic structure 36.

FIG. 4 also shows the hydraulic hoses and fittings 32 extending from the steering mechanism 12. Similarly, the height-adjusting hydraulic piston 40 has hoses and fittings 42. These hoses 32, 42 are connected to the hydraulic drive (not shown) which is controlled by control means known in the industry. However, it should be understood that more than one hydraulic drive (or any other type of suitable drive) may be used to drive the various driven components described herein.

Figure 6:
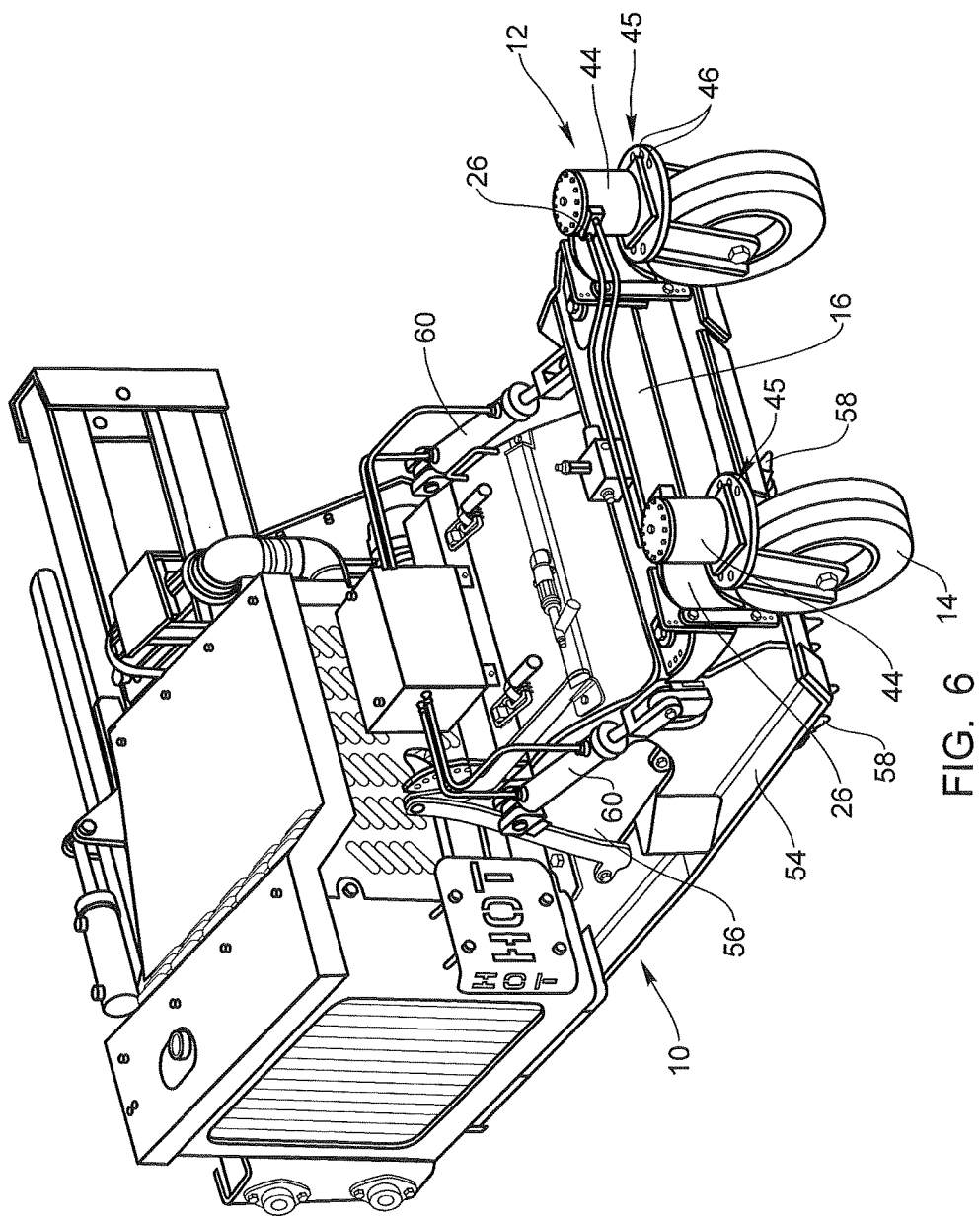
FIG. 6 is a perspective view of an alternative two-wheel embodiment of a steering mechanism for an alternate asphalt milling device showing the wheels in a forward mode.
Figure 7:
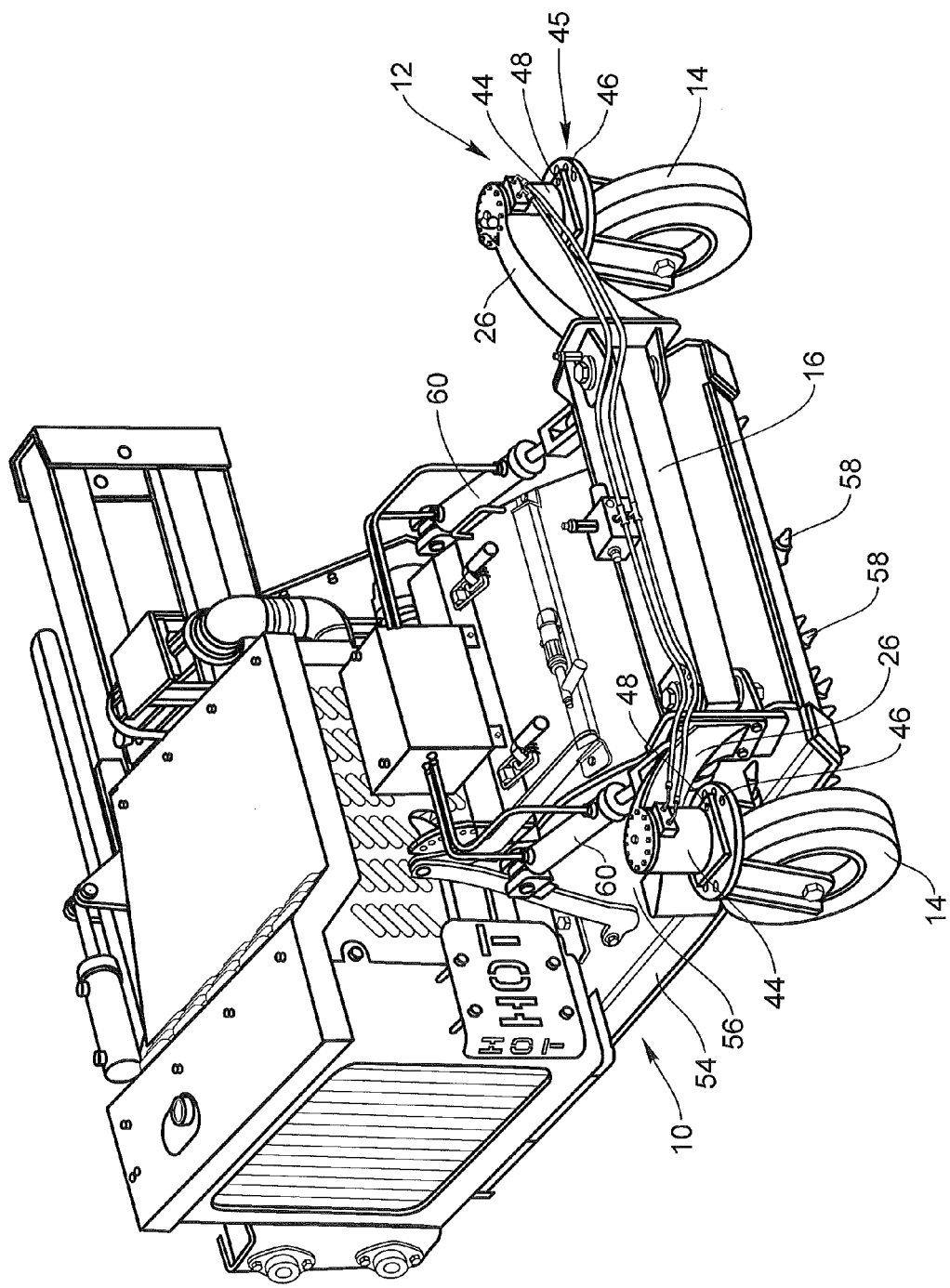
FIG. 7 is a perspective side view of the alternative two-wheel embodiment of the steering mechanism for the alternate asphalt milling device showing the wheels in a side mode.

FIGS. 6 and 7 are illustrations of an alternative embodiment, using a two-wheel configuration on an asphalt milling device 10, showing a different steering mechanism 12 and height control. With this alternative embodiment, each wheel 14 is mounted to an arm 26 that extends from the support bar 16. The pivot shaft 18 is encased within a cylinder 44 on the end of the arm 26. The direction of each wheel 14 can be controlled by independent synchronized actuator steering or can be locked, using a locking mechanism 45, into a particular direction manually (see e.g., the array of pin holes 46 and the locking pin hole 48 into which a locking pin (not shown) can be inserted). Independent synchronized actuator steering can be controlled hydraulically (hydraulic fittings 32 are shown in FIG. 6) to rotate the wheels 14 for steering. When a single, constant direction is desired, the locking mechanism 45 can be locked into a particular direction. Though the steering mechanism 12 differs from the single wheel embodiment described above, one skilled in the art can readily practice the two-wheeled embodiment based on the above disclosures and the figures shown.

The alternative embodiment of a two-wheel configuration for the asphalt milling device 10 of FIGS. 6 and 7 illustrates an embodiment where an outer frame 54 is rigid and is supported by the wheels 14 and an inner frame 56 that can hydraulically lift or lower the rotating cutting head 58 into place for milling at depths ranging from zero depth to full depth. The inner frame 56 is lifted/lowered so that the cutting head 58 is disposed in the desired cutting position by hydraulic struts 60 while the outer frame 54 maintains its disposition supported by the wheels 14 and the host vehicle 50.

Additionally, the arms 26 may pivot about their connections to the support arm 16 so that the wheels 14 can swing from a forward mode (FIG. 6) to a side mode (FIG. 7). When in the side mode, the cutter head 58 can advance much closer to a wall, an obstacle, a barrier, or the like, at the front of the asphalt milling device 10, while maintaining steering capability.

Although the exact configuration of the hydraulic drive together with the hoses and fittings, and the controls for regulating the hydraulic power have not specifically been shown, one skilled in the art, armed with the disclosure provided herein can configure the hydraulics to provide both steering and height-adjustment by locating needed controls in the host vehicle 50.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. A steering mechanism to provide steering capability for both a host vehicle and for a milling attachment separate from, but connectable to the host vehicle operated by an operator, the host vehicle providing propelling force to the milling attachment, the milling attachment having an outer frame, a height-adjustable inner frame, and a rotating cutting head fixed to the inner frame so that the cutting depth of the rotating cutting head depends on the adjusted height of the inner frame relative to the outer frame, the steering mechanism, comprising:
    an attachment mechanism configured to connect a milling attachment to a host vehicle;
    a first wheel mounted to a first pivot shaft;

a second wheel mounted to a second pivot shaft, the outer frame being supported by the first wheel, the second wheel, and the host vehicle;

a support bar disposed across the front of the milling attachment forward of the rotating cutting head and connected to the outer frame, the support bar for receiving a first arm in pivoting engagement and a second arm in pivoting engagement, the first arm receiving the first pivot shaft in pivoting engagement and the second arm receiving the second pivot shaft in pivoting engagement, wherein the first arm and the second arm are each pivotally movable from a forward mode to a side mode enabling the front of the milling attachment to advance proximate an obstacle while maintaining steering capability;

a first steering actuator connected to and providing powered rotary motion to the first pivot shaft and the first wheel;

a second steering actuator connected to and providing powered rotary motion to the second pivot shaft and the second wheel; and milling attachment steering controls positionable for access and actuation by the operator within the host vehicle to steer the milling attachment and the host vehicle, the steering controls being connected to the first steering actuator and second steering actuator of the steering mechanism allowing an operator to control steering of both the host vehicle and the milling attachment by activating the first steering actuator and the second steering actuator.

2. A steering mechanism as in claim 1, wherein the first steering actuator and the second steering actuator are independent synchronized actuators.

3. A steering mechanism as in claim 1, further comprising a first locking mechanism for locking the direction of the first wheel into a particular direction.

4. A steering mechanism as in claim 1, wherein height adjustment of the inner frame to raise and lower the rotating cutting head to various milling depths is independent of and does not impede steering capability.

5. A steering mechanism as in claim 4, wherein height adjustment of the inner frame to raise and lower the rotating cutting head does not alter the disposition of the first wheel, the second wheel and the outer frame.

\* \* \* \* \*